United States Patent [19]

Citta et al.

[11] Patent Number: 5,029,002
[45] Date of Patent: Jul. 2, 1991

[54] HIGH DEFINITION TELEVISION SYSTEM

[75] Inventors: Richard W. Citta, Oak Park; Ronald B. Lee, Chicago, both of Ill.

[73] Assignee: Zenith Electronics Corporation, Glenview, Ill.

[21] Appl. No.: 239,155

[22] Filed: Aug. 31, 1988

[51] Int. Cl.$^5$ .......................... H04N 7/00; H04N 11/00
[52] U.S. Cl. ...................................... 358/141; 358/140
[58] Field of Search .................... 358/11, 12, 133, 135, 358/137, 138, 180, 141

[56] References Cited

U.S. PATENT DOCUMENTS

| | | | |
|---|---|---|---|
| 3,617,626 | 11/1971 | Bluth et al. | 358/11 |
| 4,389,668 | 1/1983 | Favreau | 358/140 |
| 4,485,401 | 11/1984 | Tan et al. | 358/12 |
| 4,521,803 | 6/1985 | Gittinger | 358/12 |
| 4,633,294 | 12/1986 | Nadan | 358/60 |
| 4,661,850 | 4/1987 | Strolle et al. | 358/140 |
| 4,794,447 | 12/1988 | Tsinberg | 358/14 |
| 4,855,824 | 8/1989 | Fuhrer | 358/12 |

FOREIGN PATENT DOCUMENTS 59-89088  5/1984  Japan .

OTHER PUBLICATIONS

"HD-MAC: A Step Forward in the Evolution of Television Technology", by Annegarn et al; Philips Technical Review, vol. 43, No. 8, Aug. 1987, p. 198.
RCA Developments in Television, Aug. 1937, p. 15.
"Single Channel, NTSC Compatible Widescreen EDTV System", Isnardi et al; HDTV Colloquium Ottowa Canada, Oct. 4-8, 1987.
"3xNTSC-A Leapfrog Production Standard for HDTV", by Wayne E. Bretl; T-CE; IEEE Transactions on Consumer Electronics, vol. 34, pp. 484-492, Aug. 1988, as reprinted in SMPTE Journal, Mar., 1989, pp. 173-178.
"Extended Definition TV Fully Compatible with Existing Standards", by Fukinuki et al, IEEE Trans. on Consumer Elec., vol-Com 32, No. 8, Aug. 1984.
"A proposal for a New High-Definition NTSC Broadcast Protocol", by Iredale IEEE Transactions on Consumer Electronics, vol. CE-33, No. 1, Feb. 1987, pp. 14-27.

Primary Examiner—John W. Shepperd
Assistant Examiner—Michael D. Parker

[57] ABSTRACT

A high definition television system includes an encoder for encoding a video source signal having a horizontal bandwidth of about 28-30 MHz for transmission through a 6 MHz RF channel. The video source signal is provided in the form of a plurality of horizontal video lines occurring at a vertical rate equal to the NTSC field repetition rate and at a predetermined horizontal rate greater than the NTSC horizontal scanning rate. The video lines of the source signal are encoded for transmission at NTSC vertical and horizontal rates, with the lines representing the lower frequencies of the video source signal being transmitted at a higher temporal rate than the lines representing the higher frequencies. The transmitted lines are converted to a plurality of display lines by a receiver for display at a vertical rate equal to the NTSC field repetition rate and at a horizontal rate equal to the predetermined horizontal rate.

31 Claims, 10 Drawing Sheets

HIGH DEFINITION TELEVISION SYSTEM

BACKGROUND OF THE INVENTION

The present invention generally relates to high definition television (HDTV) systems and, particularly concerns an improved non-compatible HDTV system. As used herein, an HDTV system refers to a system designed for transmitting a television signal resulting in a displayed image at a receiver having a substantially improved resolution relative to the current NTSC system.

Many HDTV systems are currently under study, all having the purpose of improving the resolution afforded by the current NTSC standard system. In the NTSC system, a television signal is transmitted in the form of a plurality of video lines, the lines being arranged in successive fields for transmission. The lines of adjacent fields are interlaced with each other to provide a complete frame of video information in two fields. The lines in each field are transmitted at a horizontal rate of 15.74 KHz and the fields at a rate of 59.94 Hz. The horizontal resolution of the video signal is limited to about 4 MHz for transmission through a standard 6 MHz RF television channel.

The proposed HDTV systems may generally be categorized into three groups; compatible systems, augmentation systems and non-compatible systems. Compatible systems add to or modify an existing NTSC transmission in a manner so that it may still be viewed on an existing receiver with NTSC resolution, but may be received with higher resolution on a special HDTV receiver. The compatible transmission is normally limited to the same 6 MHz channel used for NTSC transmissions. Augmentation systems, on the other hand, transmit augmenting signals in additional spectrum space without disturbing the NTSC transmission. Thus, an existing receiver may reproduce the televised image with NTSC resolution by tuning the standard channel, while a special HDTV receiver may be used to tune both the standard channel and the augmenting signals to reproduce an HDTV image. Transmissions comprising various combinations of these two techniques are also possible.

Non-compatible systems provide HDTV transmissions which cannot be received by standard NTSC receivers. Since such transmissions must be made over unused spectrum, care must be exercised to avoid interference with existing NTSC channels. Cochannel and adjacent channel interference is of particular concern in this regard. The above referenced copending application discloses techniques for minimizing such interference. These techniques may be used with non-compatible, as well as augmentation-type, HDTV systems to allow maximum utilization of existing spectrum.

It is believed that a non-compatible system will provide the best solution to the problem of providing high quality HDTV. Compatible systems have the disadvantage of almost inevitably producing undesired artifacts in standard NTS receivers. Augmentation systems have the disadvantage that multiple RF bands must be tuned and that different signals must be precisely pieced together to form the HDTV image.

OBJECTS OF THE INVENTION

It is therefore a basic object of the present invention to provide an improved HDTV system.

It is a further object of the invention to provide an improved HDTV system of the non-compatible type.

It is another object of the invention to provide a non-compatible HDTV System in which the HDTV transmissions are made over a standard 6 MHz television channel in a manner so as to minimize interference with existing NTSC transmissions.

It is yet another object of the invention to provide an improved HDTV system in which an image is transmitted and reproduced in a manner matching the visual performance of the human eye.

The HDTV system of the present invention provides an improvement in horizontal resolution of about 1.84 relative to NTSC for a receiver haVing a 5:3 aspect ratio, and about 1.73 in the case of a 16:9 aspect ratio display. In order to provide an approximate doubling of NTSC resolution, the displayed image on the receiver is produced by 720 lines of active video progressively scanned at the NTSC vertical field rate of 59.94 Hz and at a horizontal scan rate of three times NTSC (47.2 KHz), with each line having a horizontal resolution of about 1020 lines per width (lpw), or, stated otherwise, about 510 cycles per picture width (cpw). In order to support this horizontal resolution, the minimum horizontal bandwidth of the video source signal at the transmitter is 28.9 MHz. This source signal may be provided at the transmitter by a video source producing a 787.5 line progressively scanned signal, having a vertical rate of 59.94 Hz and a horizontal scan rate of 47.2 KHz. The video source signal is encoded for transmission over a 6MHz RF channel, the encoding process converting the video source signal into a transmission format having a line and field structure equivalent to that used in NTSC to facilitate the reduction of cochannel interference between HDTV and NTSC cochannels. In addition, the HDTV signal is more easily transcoded into an NTSC signal.

More specifically, the HDTV source signal is transmitted over a 6 MHz RF channel in a format wherein each frame comprises five (5) fields transmitted at the NTSC vertical rate of 59.94 Hz. Each field actually comprises a pair of sub-fields, each transmitted on a respective quadrature component of a suppressed carrier signal approximately centered in the RF channel. Within the context of this transmission format, the video source signal is encoded according to a scheme whereby low frequency horizontal and vertical luma components are transmitted at the NTSC vertical rate of 59.94 Hz while the higher frequency luma components and color difference components are transmitted at 1/5 this rate (i.e. approximately 12 Hz).

Briefly, the luma component of the video source signal is initially separated into three substantially contiguous horizontal frequency bands which, together with a pair of color difference signals, are then encoded into a series of components collectively comprising 480 lines of video and color information every 1/59.94 seconds. Each line has a time duration of about 63.56 microseconds (corresponding to an NTSC horizontal line including the blanking interval) and has a nominal bandwidth of 2.675 MHz. The 480 lines are divided between two sub-fields each including 240 active lines of video information. Five pairs of sub-fields comprise a complete frame of video information. In addition to the 240 pairs of video lines, each sub-field pair also includes a block of audio, timing and synchronizing signals. The audio, timing and sync signals occupy the equivalent of 22 and 23 NTSC horizontal lines in successive fields, corresponding to the vertical blanking interval of an NTSC signal. The video lines, which are derived from the lines of the video source signal, are selected for transmission in a manner providing an optimal match with the human visual system. Thus, the video lines representing the low frequency luma component, are transmitted at a high temporal rate (59.94Hz) for good motion rendition while the video lines representing the higher frequency luma components, together with the color difference components, are transmitted at a lower temporal rate (12Hz). In addition, the lines are time multiplexed for transmission such that a predetermined number of lines derived for each luma horizontal frequency band is transmitted each field. This allows decoding of the transmission to be effected using the equivalent of a single frame store. Resolution of edges of the video image displaced from true vertical and horizontal is optimized by transmitting the low frequency luma band at full vertical resolution and reducing the transmitted resolution of the higher luma bands in discrete steps.

BRIEF DESCRIPTION OF THE DRAWINGS

These and other objects and advantages of the invention will be apparent upon reading the following description in conjunction with the drawings, in which.

DESCRIPTION OF THE PREFERRED EMBODIMENT

Figure 1:
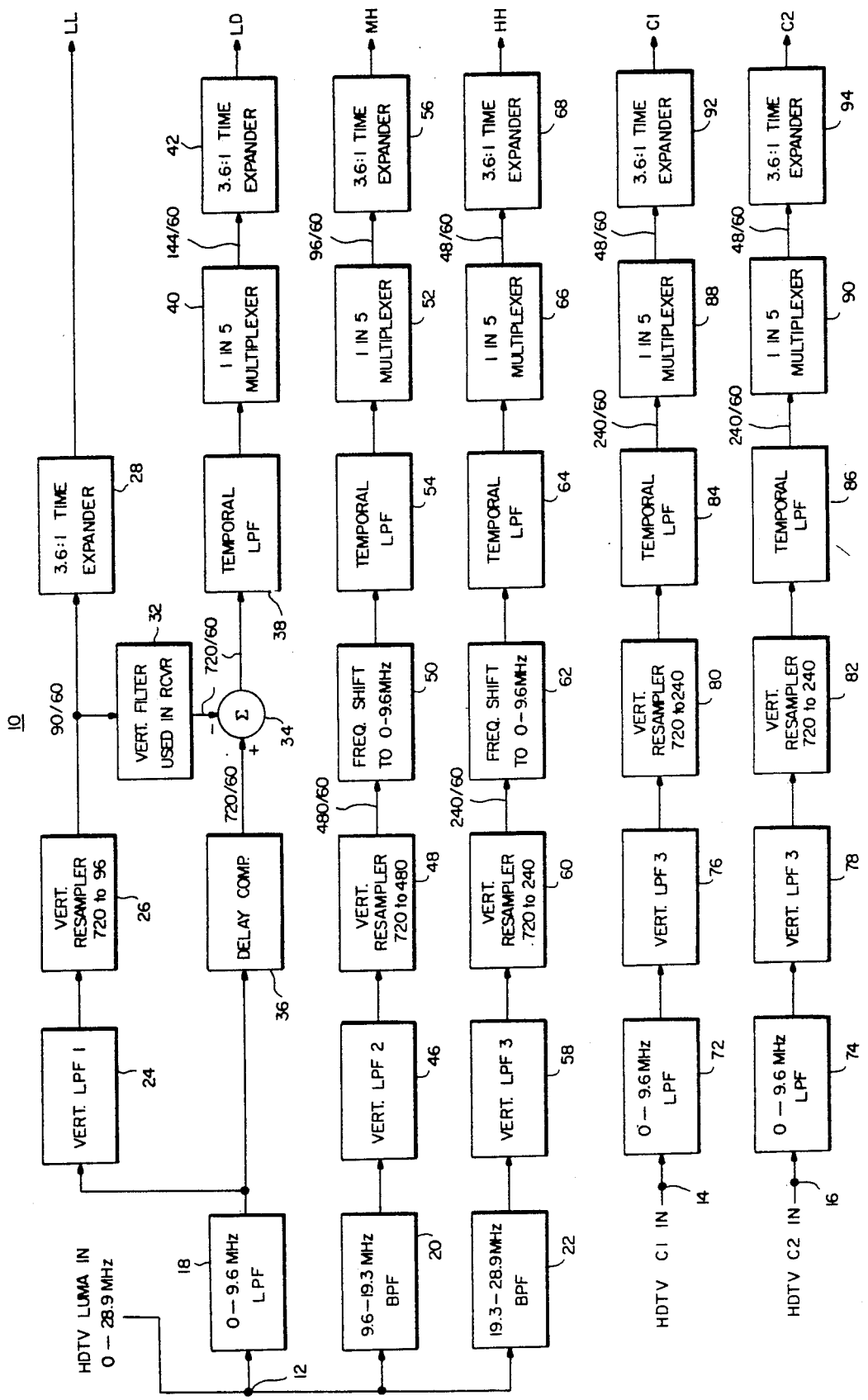
FIG. 1 is a block diagram of an encoder for encoding an HDTV transmission according to the invention.

The encoding process of the invention is illustrated in detail in FIG. 1. As shown in the Figure, an encoder 10 receives three input signals from a HDTV signal source, such as a video camera; an HDTV luma input signal at a terminal 12 and two HDTV color difference input signals C1 and C2 at terminals 14 and 16, respectively. The input luma and color difference signals are preferably provided in digital form. Also, the HDTV signal source may provide RGB output signals, in which case a suitable matrix circuit would be used to provide the luma and two color difference input signals. In order to achieve the desired resolution, the output of the HDTV signal source comprises a progressively scanned 787.5 line image (three times the number of lines in an NTSC field), having a vertical rate exactly equal to the NTSC vertical rate of 59.94 Hz and a horizontal rate of 47.2 KHz which is exactly equal to three times the NTSC horizontal scanning rate. The output signal further has a minimum horizontal bandwidth of 28.9 MHz.

Figure 2:
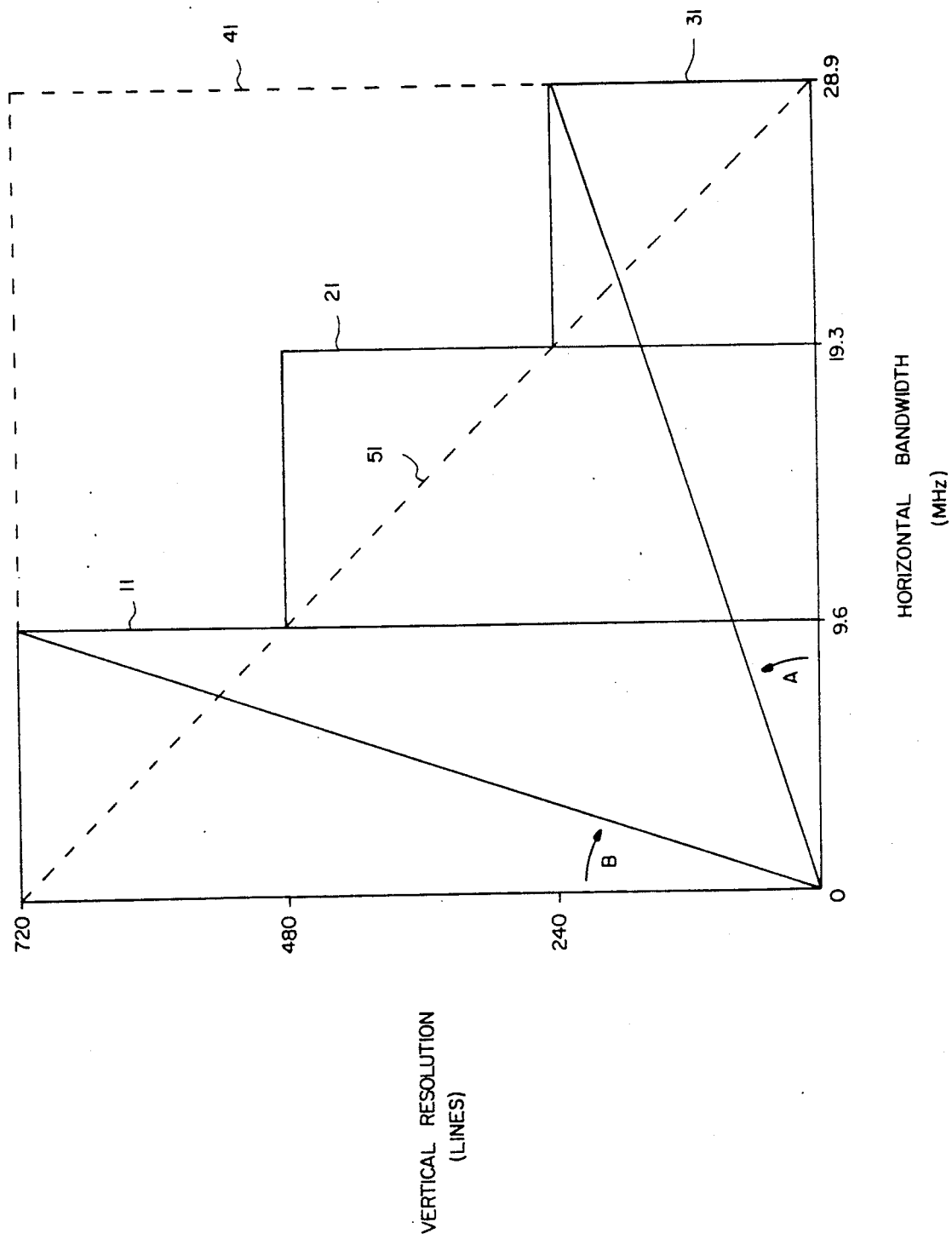
FIGS. 2 and 3 graphically illustrate portions of the encoding process performed by the encoder of FIG. 1.

As explained in further detail below, the luma encoding process initially separates the luma signal provided at input terminal 12 into three (3) horizontal frequency bands of approximately 9.6 MHz as shown in FIG. 2. All of the information in the low band (0–9.6 MHz) is transmitted in one frame (5 fields) at the full vertical resolution of 720 lines as represented by rectangle 11. All of the information in the middle (9.6–19.3 MHz) and high (19.3–28.9 MHz) bands are also transmitted in one frame but at reduced vertical resolutions of 480 and 240 lines as represented by rectangles 21 and 31 respectively.

If all three horizontal bands were to be transmitted at full vertical resolution (720 lines), the spectrum required would be that represented by the large rectangle 41. This spectrum may be reduced in half by limiting the vertical resolution of each band as defined by the diagonal line 51, as has been proposed in the art. However, this technique has a number of disadvantages. First, extremely complicated and expensive two-dimensional diagonal filters must be used to achieve the illustrated result. Second, and perhaps more important, resolution for edges which are not quite vertical or horizontal is severely degraded. Vertically tilted or displaced edges are represented by angle A in the Figure while horizontally tilted or displaced edges are represented by angle B. Such tilted or displaced edges occur frequently in video images and preferably should be reproduced with maximum resolution. However, as previously mentioned, in the case of the diagonally filtered spectrum, such edges are severely degraded. In particular, since the maximum vertical resolution is defined by diagonal 51, as angle A or B begins to increase (due to an edge being tilted from vertical or horizontal respectively) resolution is immediately reduced, the reduction increasing linearly along diagonal 51. In fact, full vertical or horizontal resolution is only achieved for perfectly vertical or horizontal edges.

These limitations are overcome according to the invention by providing full vertical resolution for the entire low frequency band 11, and reducing the resolution in discrete steps for the middle and high bands 21 and 31 as shown. Full vertical resolution is therefor achieved for edges displaced from true vertical by as much as the angle A. Similarly, full horizontal resolution is achieved for edges displaced from true horizontal by as much as the angle B. In addition, the spectrum can be realized using only relatively straight-forward vertical and horizontal filters rather than the much more complex two-dimensional diagonal filters. The only slight disadvantage is that there is only about a 33% spectrum utilization reduction (rather than 50%) relative to the full spectrum represented by rectangle 41.

Figure 3:
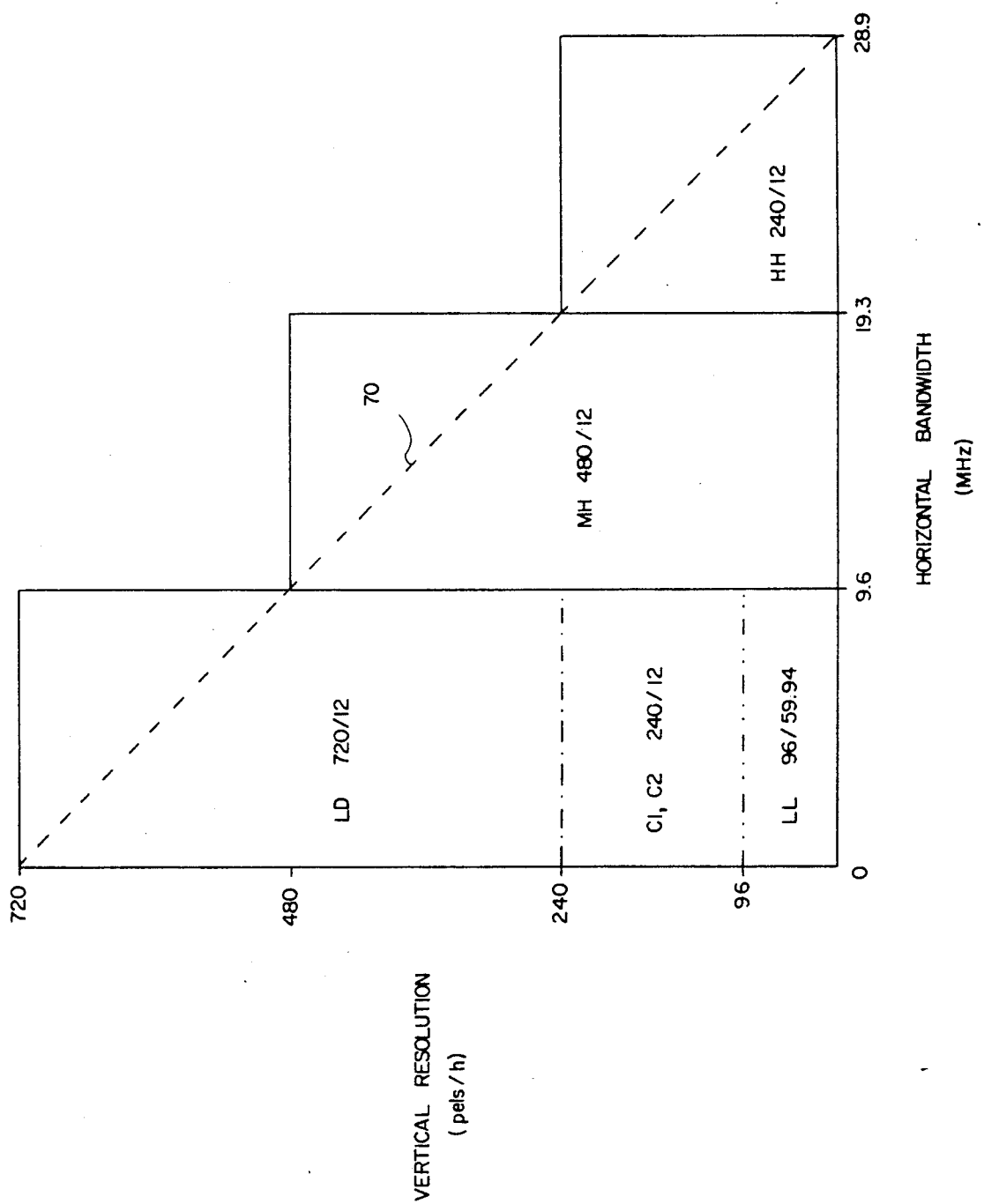

The luma encoding process actually separates the luma signal provided at input terminal 12 of encoder 10 into four components, two components representing the low horizontal frequency band and one component for each of the middle and high bands. These four components are shown in FIG. 3 where they are labeled LL, LD, MH and HH. Together, the LL and LD components represent the lower one-third (0–9.6 MHz) of the horizontal frequencies of the HDTV luma input signal with full 720 line vertical resolution. The MH component represents the middle one-third (9.6–19.3 MHz) of the horizontal frequencies with only 480 lines of vertical resolution and the HH component represents the upper one-third (19.3-28.9 MHz) of the horizontal frequencies with 240 lines of vertical resolution. The LL component is transmitted at the rate of 59.94 Hz for providing a low detail video image at a relatively high temporal rate while all of the remaining components are time multiplexed for transmission at 1/5 this rate (approximately 12 Hz) for updating the high detail video information at a relatively low temporal rate.

With further reference to FIG. 1, the input luma signal at terminal 12 is initially applied to three input filters 18, 20 and 22 which separate the input luma signal into the three 9.6 MHz bands illustrated in FIGS. 2 and 3. Filter 18 is a low-pass filter which passes only the lower one-third of the horizontal frequencies of the input luma signal, while filters 20 and 22 are bandpass filters which respectively pass the middle and upper one-third of the horizontal frequencies.

The 0-9.6 MHz signal developed at the output of filter 18 is coupled to a first vertical low-pass filter 24 and therefrom to a first vertical resampler 26. It will be recalled that the video source provided a signal having 787.5 progressively scanned horizontal lines at a vertical rate of 59.94 Hz. Of these 787.5 lines, 720 represent active video. Circuit 26 resamples the 720 lines of active video to 96 lines for developing component LL for transmission at a 59.94 Hz rate. Filter 24 is provided to smooth the vertical transitions of the output of horizontal filter 18 so as to provide a signal compatible with the resampling rate of circuit 26. That is, by selecting a cut-off frequency for vertical low-pass filter 24 corresponding to approximately 96/2 or 48 cycles per picture height, no aliasing products will be generated by circuit 26 during the resampling process. Prior to transmission, the 96 lines provided at the output of vertical resampler 26 are time expanded by a factor of 3.6:1 in a first time expander circuit 28. This, at the same time, reduces the horizontal bandwidth of each line by a factor of 3.6:1 to approximately 0-2.7 MHz. This time expansion factor expands each line to a duration of approximately 63.56 microseconds. The entire line may be used to transmit video information or, alternatively, a small portion of each line may be reserved for an appropriate blanking signal. The output of circuit 28 is therefore a 0-2.7 MHz horizontal bandwidth component LL (see FIG. 3) which represents the lower one-third of the horizontal frequencies of the input luma signal with a vertical resolution of 96 lines, each line having a duration of 63.56 microseconds (corresponding to an NTSC horizontal line). The 96 lines of component LL are transmitted at a vertical rate of 59.94 Hz. This component, which therefore represents the low horizontal and vertical luma information, carries the bulk of the motion information which can be seen by the human eye, and is therefore sent at a relatively fast update rate.

In the receiver, to be described in detail hereinafter, the 96 lines of component LL received each field are processed by a vertical filter to provide a low frequency luma image on all 720 active lines of the display. This low frequency luma image is, in effect, obtained by interpolating the 96 lines of component LL received each field into 720 lines on the display. The remainder of the vertical detail in the 0-9.6 MHz horizontal band is transmitted as lines of a difference component LD. The transmitted lines of difference component LD are used to update the vertical detail in the low frequency luma image produced in response to component LL on a line-by-line basis during each field of the transmitted five field frame.

The lines of difference component LD are derived in encoder 10 by using a vertical filter 32 identical to the vertical interpolating filter used in the receiver. The input to vertical filter 32 is derived from the output of vertical resampler 26 and thus comprises the non-time-base-expanded 96 lines per field of component LL. Vertical filter 32 interpolates this signal into the same 720 lines per field produced in the receiver for generating the low frequency luma image, and couples these 720 lines to the negative input of a summer 34. An interpolation algorithm is preferably employed wherein weighted representations of the 96 lines are used in deriving the interpolated lines. The positive input of summer 34 is derived from the output of 0-9.6 MHz horizontal filter 18. This signal represents the lower one-third of the horizontal frequencies of the HDTV luma signal, but with full 720 line vertical detail. A delay compensation circuit 36 is interposed between filter 18 and summer 34 to compensate for any delays produced by vertical filter 24 and vertical resampler 26. Summer 34 therefore operates to subtract corresponding lines of the interpolated signal from the full vertical detail signal to produce 720 difference lines per field. Each line represents the difference between the full vertical detail line in the low horizontal frequency band and the corresponding interpolated line developed in the receiver for producing the low frequency luma image. As explained below, the difference lines are transmitted as component LD to periodically update the vertical resolution of the image produced in the receiver in response to the lines of component LL.

The 720 difference lines per field developed at the output of summer 34 are applied to a temporal low pass filter 38 which is used to reduce aliasing components in the difference lines during motion. The output of filter 38 is, in turn, applied to a 1 of 5 multiplexer 40 and therefrom to a 3.6:1 time expander circuit 42. Multiplexer 40 passes 1/5 or 144 of the 720 difference lines developed each field for transmission in an interlaced pattern, 720 of such lines therefore being transmitted in 1/12 second. The interlace pattern for five successive fields may be as shown below in Table 1.

TABLE 1

| Fields | Difference Lines Transmitted |
|---|---|
| 1 | 1, 6, 11, 16 ... 716 |
| 2 | 3, 8, 13, 18 ... 718 |
| 3 | 5, 10, 15, 20 ... 720 |
| 4 | 2, 7, 12, 17 ... 717 |
| 5 | 4, 9, 14, 19 ... 719 |

Time expander 42 is similar to time expander 28 and time expands each line provided by multiplexer 40 by a factor of 3.6:1 to develop component LD. At the same time, circuit 42 reduces the horizontal bandwidth of the difference lines by a factor of 3.6:1 to approximately 0-2.7 MHz. The output of circuit 42 is therefore a 0-2.7 MHz horizontal bandwidth difference component LD (see FIG. 3) comprising 144 difference lines per field (or 720 lines every 1/12 second), each line having a duration of 63.56 microseconds. Each field of 144 difference lines of component LD will be used to update the vertical resolution of the low frequency luma image produced in the receiver in response to component LL.

The middle third of the horizontal frequencies, represented by component MH in FIG. 3, are coupled by a second vertical low pass filter 46 to a second vertical resampler circuit 48. Resampler 48 resamples the 720 lines of active video provided each field by filter 46 to 480 lines. Vertical low pass filter 46 has a cut-off frequency corresponding to approximately 240 cycles per picture height for inhibiting the production of aliasing products by circuit 48 during the resampling process.

The 480 lines per field developed at the output of resampler 48, representing the middle third of the horizontal frequencies of the HDTV luma component, are frequency shifted in circuit 50 to 0–9.6 MHz. The frequency shifted lines are then coupled to a second 1 of 5 multiplexer 52 by a second temporal low pass filter 54. As in the case of filter 38, temporal filter 54 is used to reduce aliasing of the MH component during motion. Multiplexer 52 passes 1/5 or 96 of the 480 MH component lines developed by resampler 48 for transmission during each field. The 96 lines of the MH component are also interlaced for transmission in a manner similar to that previously described.

The output of multiplexer 52 is coupled to a time expander circuit 56 which is similar to expanders 28 and 42 and which time expands each line provided by multiplexer 52 by a factor of 3.6:1 (and reduces its horizontal bandwidth by a corresponding factor) to develop the lines of component MH for transmission. The output of expander 56 therefore comprises a 0–2.7 MHz horizontal bandwidth component MH (see FIG. 3) of 96 lines per field (or 480 lines every 1/12 second) representing the vertically filtered middle third of the horizontal frequencies of the HDTV luma component. Due to the vertical filtering and resampling, the static vertical resolution of component MH will be ⅓ that of the low horizontal frequency components LL and LD. Each transmitted field of 96 lines of component MH will be used to update the horizontal and vertical resolution of the low frequency luma image produced in the receiver.

The high third of the horizontal frequencies of the HDTV luma component provided by bandpass filter 22 are processed in a similar manner to produce component HH (see FIG. 3) for transmission. The output of filter 22 is coupled by a third vertical low pass filter 58 to a vertical resampler 60. Circuit 60 resamples the 720 active video lines to 240 lines which are frequency shifted to 0–9.6 MHz by a frequency shifting circuit 62. The frequency shifted lines are coupled by a third temporal low pass filter 64 to a third 1 of 5 multiplexer 66 which passes 1/5 or 48 of the 240 lines developed each field in a manner similar to that previously described with respect to the lines of component MH. The 4 lines of component HH will also be interlaced for transmission as previously described. The output of multiplexer 66 is finally time expanded and reduced in horizontal bandwidth by factors of 3.6:1 in expander circuit 68 to develop the lines of component HH for transmission. The horizontal frequencies represented by the 48 lines of component HH transmitted each field will only have ⅓ the static vertical resolution of the low horizontal frequency components.

The net effect of the foregoing is to allow for the transmission of a HDTV luma signal having a 28.9 MHz horizontal bandwidth over a 6 MHz RF channel. This is made possible to a large extent by the transmission of the various components of the luma signal in a temporal manner as described above. The vertical resolution of the luma signal is, however, different for each of the horizontal frequency bands as shown in FIGS. 2 and 3, the low horizontal frequencies having a vertical resolution of 720 lines, the middle frequencies 480 lines and the high frequencies 240 lines. The net effect of these differences is a reduction in diagonal resolution as previously described.

In addition, the transmission is effected such that a predetermined number of lines of each of the components LL, LD, MH and HH will be transmitted during each field. In the case of component LL, all 96 lines are transmitted while a reduced number of lines of components LD (144 of 720), MH (96 of 480) and HH (48 of 240) are transmitted each field. This arrangement allows an updated image to be reproduced by the receiver each field, with the low frequency video information being fully updated each field and the higher frequency information being updated on a partial basis each field and fully updated in a complete frame. Also, since the image reproduced by the receiver is updated on a line-by-line basis each field, the receiver requires the equivalent of only a single frame store.

The color difference components C1 and C2 provided at terminals 14 and 16 respectively of encoder 10 are processed using techniques similar to those used for processing the luma components. The C1 and C2 signals are initially bandlimited to 9.6 MHz by low pass filters 72 and 74 respectively. The bandlimited C1 and C2 signals are then vertically filtered by vertical low pass filters 76 and 78 respectively before being vertically resampled by resamplers 80 and 82. Both signals are resampled from 720 vertical lines to 240 lines and are then filtered by temporal low pass filters 84 and 86 prior to being decimated by a factor of five by one of five multiplexers 88 and 90. Thus, each of the multiplexers 88, 90 passes 48 of the 240 vertically resampled lines produced each field in a manner similar to that previously described with respect to components MH and HH. The outputs of multiplexers 88 and 90 are then applied to a pair of 3.6:1 time expanders 92 and 94. As will be explained in further detail hereinafter, the 480 (240×2) lines of color difference components are transmitted in an interlaced pattern and will be interpolated at the receiver into 720 active lines to provide a smooth color presentation. The color difference resolution will be one third the horizontal and vertical resolution of the transmitted luma components. In comparison, in the horizontal direction, this is 4.48 times NTSC chroma resolution and 0.5 times NTSC chroma resolution in the vertical direction.

As a result of the foregoing encoding, the low horizontal and low vertical frequency luma component LL will be updated every field (i.e. every 1/59.94 seconds) to provide very good motion reproduction where the human eye is most sensitive to movement. Updates for the higher frequency luma components LD, MH and HH, as well as for the color difference components C1 and C2, for which the human eye is less sensitive to movement, will occur on a partial basis every field, but will require an entire frame (five fields or approximately 1/12 second) for a complete update.

The encoding process described herein results in the development transmitted every field (1/59.94 seconds), each line having a horizontal bandwidth of 2.7 MHz and a duration of 63.56 microseconds. In particular, 96 lines of component LL, 144 lines of component LD, 96 lines of component MH, 48 lines of component HH and 96 lines of components C1 and C2 must be transmitted every field. In order to maintain compatibility with the existing NTSC line transmission structure, the lines are paired and transmitted on respective quadrature components of a suppressed video carrier approximately centered in a 6 MHz RF channel. Each field can therefore be considered to comprise two sub-fields, each sub-field corresponding to a respective quadrature component of the video carrier. Each sub-field is therefore used to transmit 240 of the 480 HDTV lines corresponding to 240 active NTSC video lines. On the average, this leaves 22½ NTSC equivalent lines every 1/59.94 seconds for the transmission of audio, timing and sync information during each sub-field.

Figure 4:
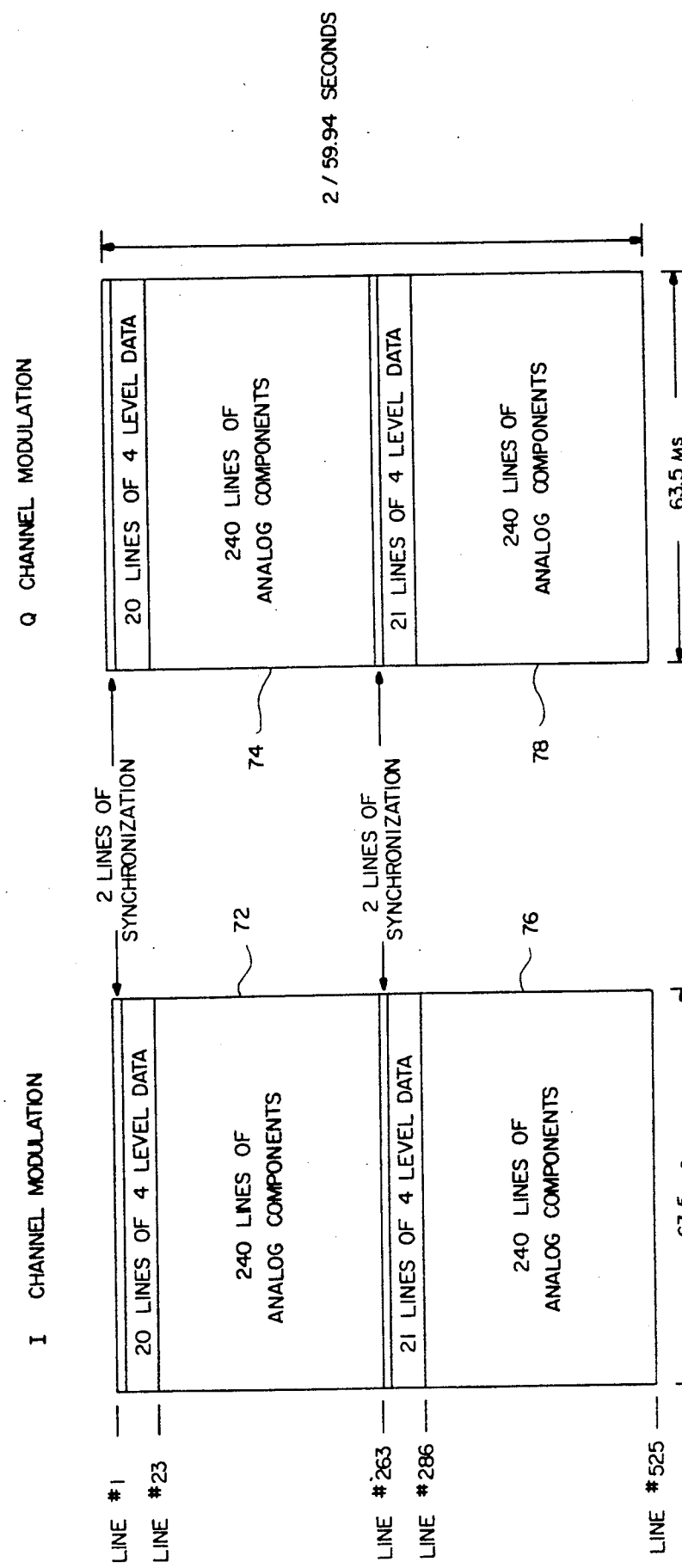
FIG. 4 pictorially illustrates the format in which the encoded video information provided by the encoder of FIG. 1 is transmitted according to the invention.

The structure of the sub-fields is illustrated in FIG. 4. The quadrature components of the video carrier on which the respective sub-fields are modulated are represented by a first column labeled I channel modulation and a second column labeled Q channel modulation. Sub-field 72 of the I channel and corresponding sub-field 74 of the Q channel together represent a first HDTV transmission field pair having a time duration of 1/59.94 seconds. Sub-field 76 transmitted immediately after sub-field 72 on the I channel and sub-field 78 transmitted immediately after sub-field 74 on the Q channel, represent a second HDTV transmission field pair. In addition to the two sets shown, three similar sets of sub-field pairs are sequentially transmitted on the I and Q channels to complete the HDTV transmission frame. It will be observed that the line structure of each sub-field is equivalent to that of an NTSC field, each sub-field comprising 240 lines of luma and color difference HDTV components and, and on the average, 22½ additional lines corresponding to the NTSC vertical blanking interval (VBI). Actually, alternate sub-fields include 22 and 23 VBI lines as illustrated. As mentioned previously, this equivalency facilitates the reduction of interference between NTSC and HDTV cochannels and also makes it easier to transcode an HDTV signal into NTSC format.

The pairing of HDTV lines in corresponding sub-fields is chosen to minimize sensitivity to crosstalk which might occur between the quadrature channels under non-ideal conditions. In a preferred embodiment of the invention, the five line pairing sequence shown in Table 2 is repeated 48 times in each sub-field for a total of 240 lines. It will be observed that this sequence provides for the transmission of 96 lines of component LL, 144 lines of component LD, 96 lines of component MH, 48 lines of component HH and 48 lines of each of components C1 and C2 each field.

TABLE 2

| Line # | I Channel | Q Channel |
|--------|-----------|-----------|
| 1 | LL | LL |
| 2 | LD | LD |
| 3 | LD | MH |
| 4 | MH | HH |
| 5 | C1 | C2 |

Since no synchronizing signals are provided in the transmitted lines of the HDTV components, synchronizing and timing information is provided during the transmitted VBI lines. Thus, two lines of the VBI of each sub-field are reserved for the transmission of a high frequency data clock (340×15.734 KHz), along with a vertical chirp and a horizontal chirp. The data clock establishes the basic timing for the encoder 10 and the decoder in the receiver, while the two chirp signals identify the phases of the clock signal required for deriving appropriate horizontal and vertical deflection signals in the receiver.

Figure 5:
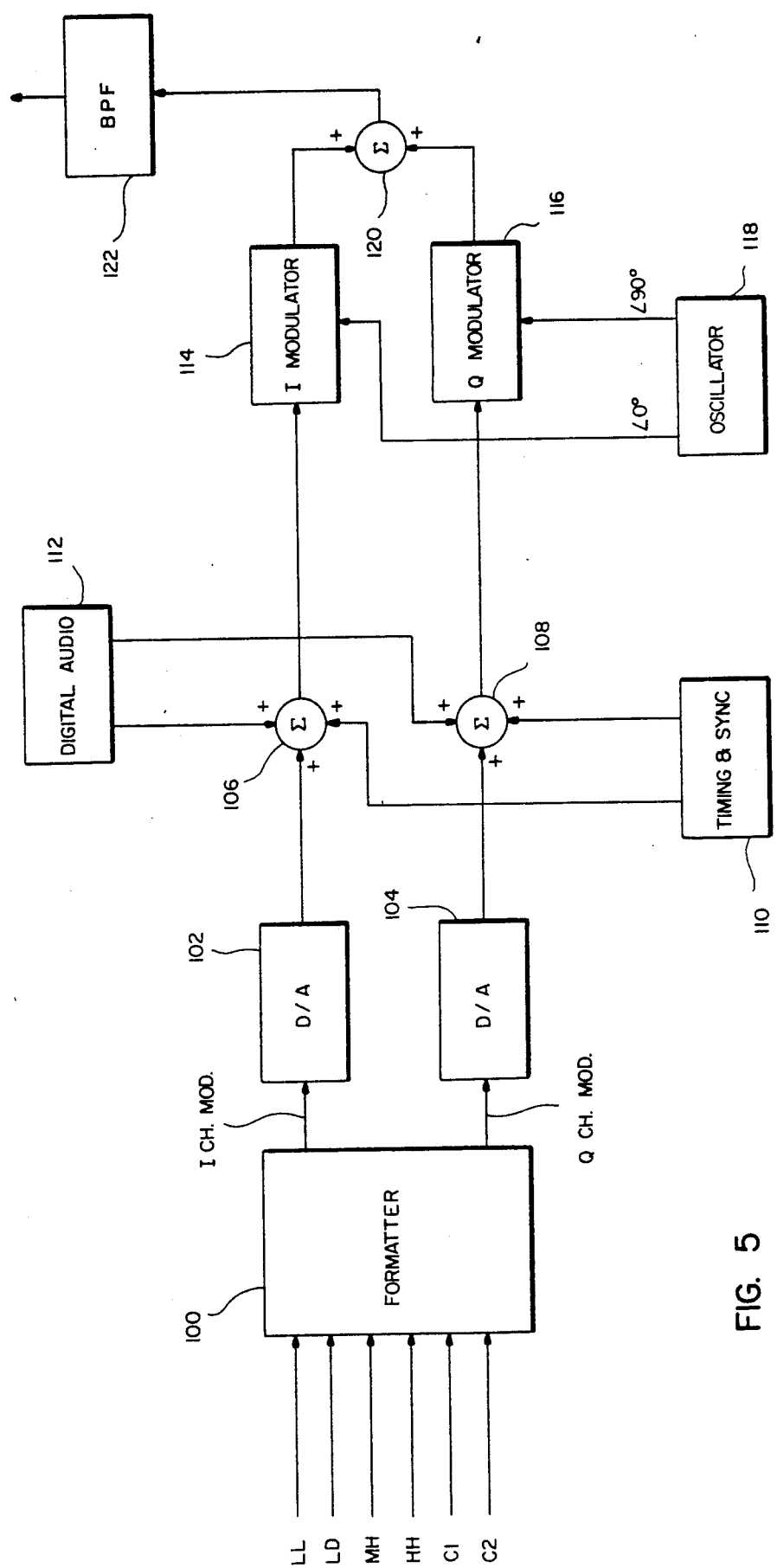
FIG. 5 is a simplified block diagram of a circuit for transmitting the encoded video information provided by the encoder of FIG. 1.

FIG. 5 is a block diagram illustrating the manner by which the luma and color components generated by encoder 10, as well as the related audio, timing and sync information is transmitted according to the invention. As previously described, these signals are transmitted as suppressed carrier amplitude modulation of quadrature components of a picture carrier located in the center of a 6 MHz RF channel. This technique makes optimum use of the 6 MHz channel in an environment subject to interference of various forms including interference caused by NTSC cochannels. The audio, timing and sync information is preferably transmitted during the vertical blanking interval lines of each sub-field (see FIG. 4). Since the line structure of the HDTV transmission format described herein is equivalent to that used for NTSC transmissions, the HDTV vertical blanking interval can be frame locked to coincide with the vertical blanking interval of an existing NTSC channel which is likely to receive interference from the HDTV channel. Since data would be the most visible interference into the NTSC cochannel, frame locking assures that the data will be hidden in the vertical blanking time of the NTSC channel.

With further reference to FIG. 5, the luma components LL, LD, MH and HH together with the color difference components C1 and C2 generated by encoder 10 are coupled to a formatter 100. Formatter 100 appropriately formats the HDTV components into sub-fields as illustrated in FIG. 4 (see also Tables 1 and 2) for providing an I channel modulation output and a Q channel modulation output. The two outputs of formatter 100 are converted to analog signals by D/A converters 102 and 104 and then coupled to inputs of respective summers 106 and 108. Both summers also receive inputs from a timing and synch source 110 and from a digital audio source 112 for inclusion in the VBI lines of the respective sub-fields. The outputs of the summers are coupled to an I modulator 114 and a Q modulator 116 for transmission. An oscillator 118 provides an in-phase carrier to I modulator 114 and a quadrature carrier to Q modulator 116. Quadrature modulators 114 and 116 provide RF outputs at the same picture carrier frequency, but 90 degrees different in phase. The two RF outputs are combined in a summer 120 and passed to a bandpass filter 122 for filtering and waveshaping prior to transmission.

Figure 6:
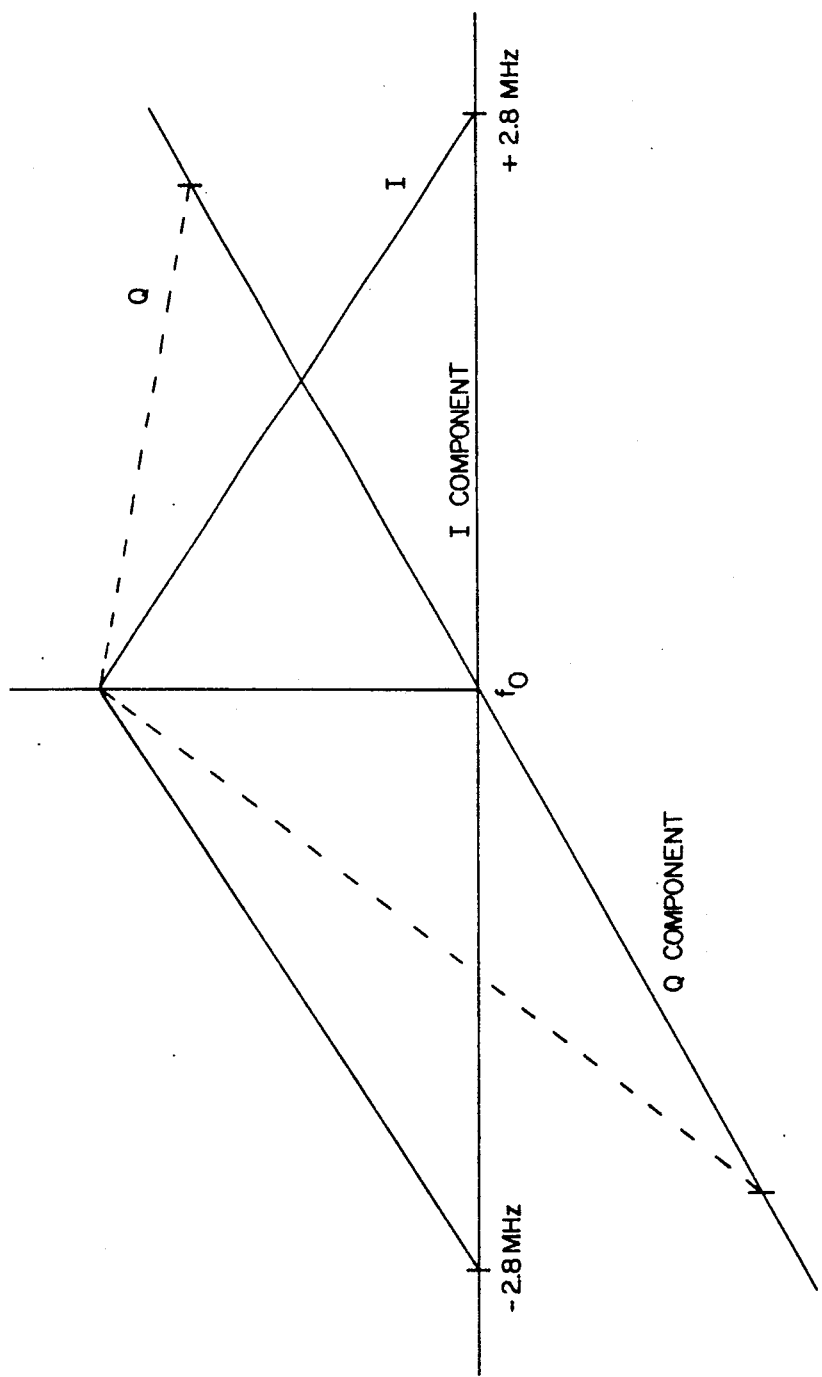
FIG. 6 graphically depicts the manner in which the transmission circuit of FIG. 5 modulates an RF carrier.
Figure 7:
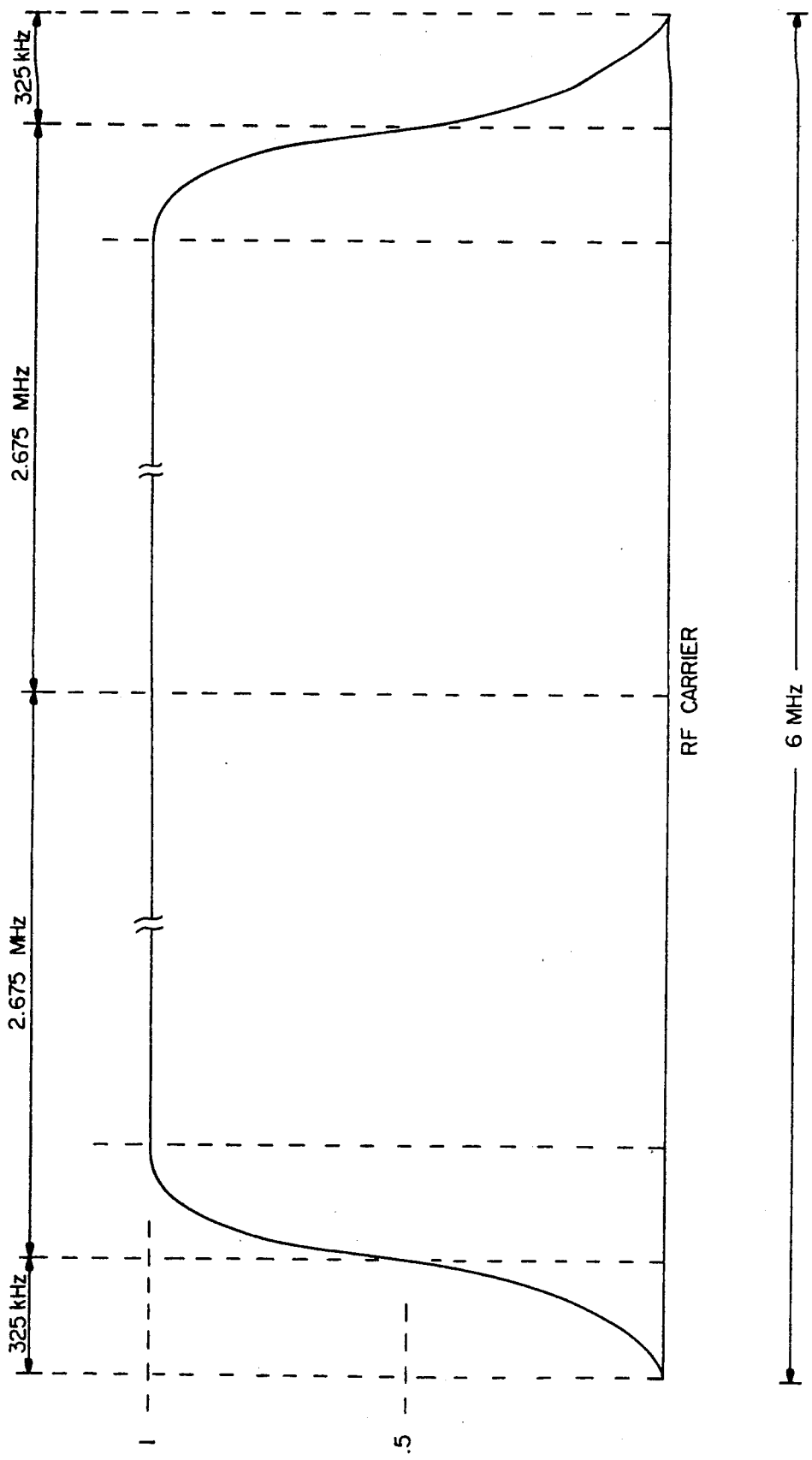
FIG. 7 graphically illustrates the channel shape used to transmit an HDTV signal according to the invention.

The resulting quadrature modulation of the 6 MHz RF channel is illustrated in FIG. 6, where f0 is the frequency of the suppressed video carrier in the center of the channel. The overall channel shape is shown in FIG. 7. It will be observed that the channel is flat for 2.35 MHz on either side of the carrier frequency and then drops off with a Nyquist slope centered about 2.675 MHz (170×15.734 KHz) from the carrier frequency. The Nyquist slope is therefore centered about one-half the bit clock rate of 340×15.734 KHz. This overall channel shape, which must have a linear phase response, provides good transition regions while maximizing the data rate and minimizing intersymbol interference. The overall bandwidth, including the Nyquist transition regions, is plus or minus 3.0 MHz from carrier frequency. In order to achieve the channel shape illustrated in FIG. 7, bandshaping is preferably split between the transmitter and the receiver such that the receiver can have a "haystack" type response centered about the video carrier. The "haystack" receiver response allows the simplest and most economical filter design in the receiver with excellent adjacent channel rejection. The transmitter bandshaping is provided by bandpass filter 122 shown in FIG. 5.

Figure 8:
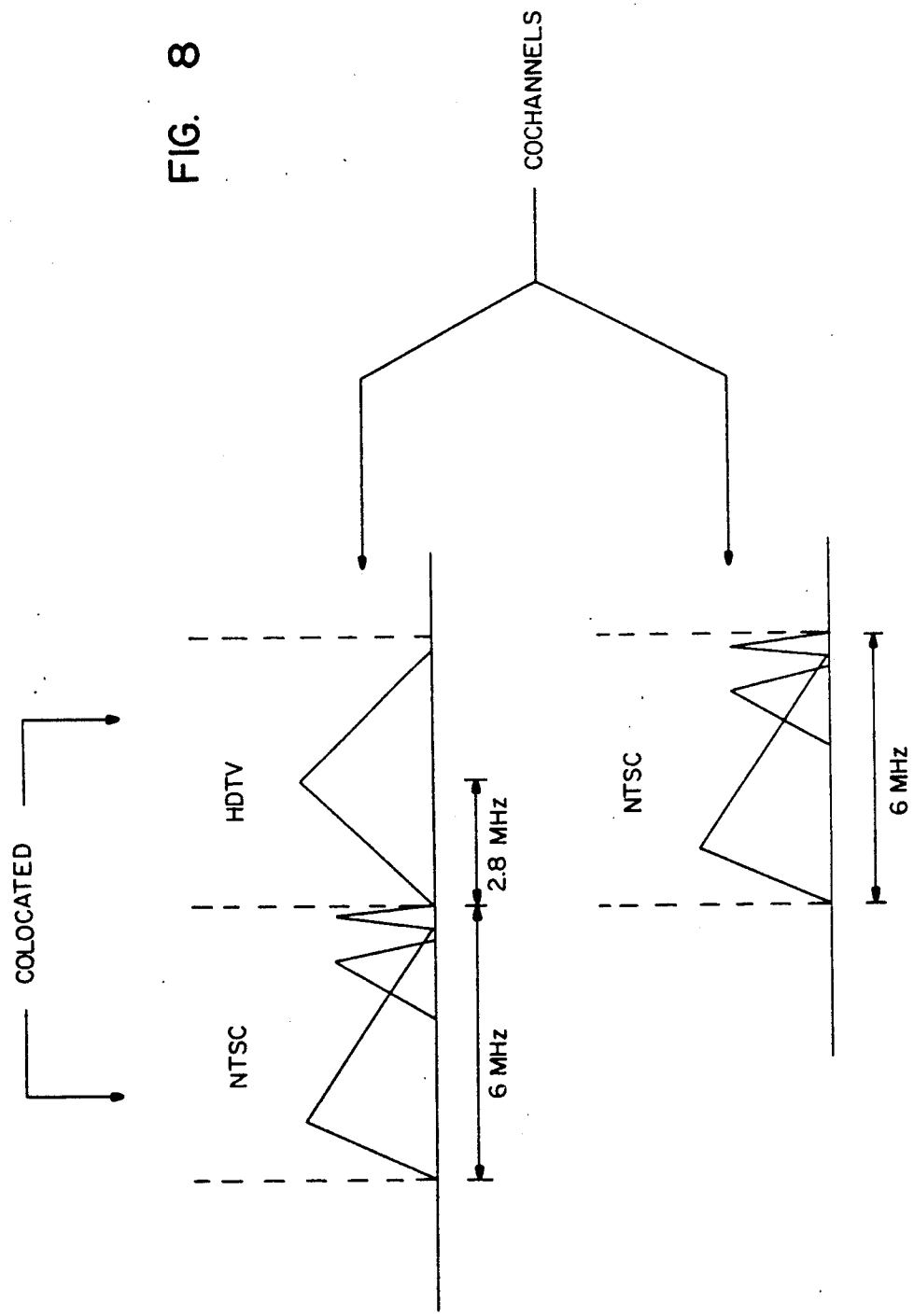
FIG. 8 graphically illustrates an HDTV transmission according to the invention in relation to adjacent and cochannel NTSC transmissions.

The spectrum of the HDTV channel in relation to the NTSC channels around it is shown in FIG. 8. It will be seen that the placement of the HDTV carrier is offset slightly from the center of the channel in order to avoid the cochannel sound carrier. This offset permits the HDTV receiver to incorporate a sound trap to eliminate the interference. Collocation with adjacent NTSC channels is preferred to avoid adjacent channel overload.

Figure 9:
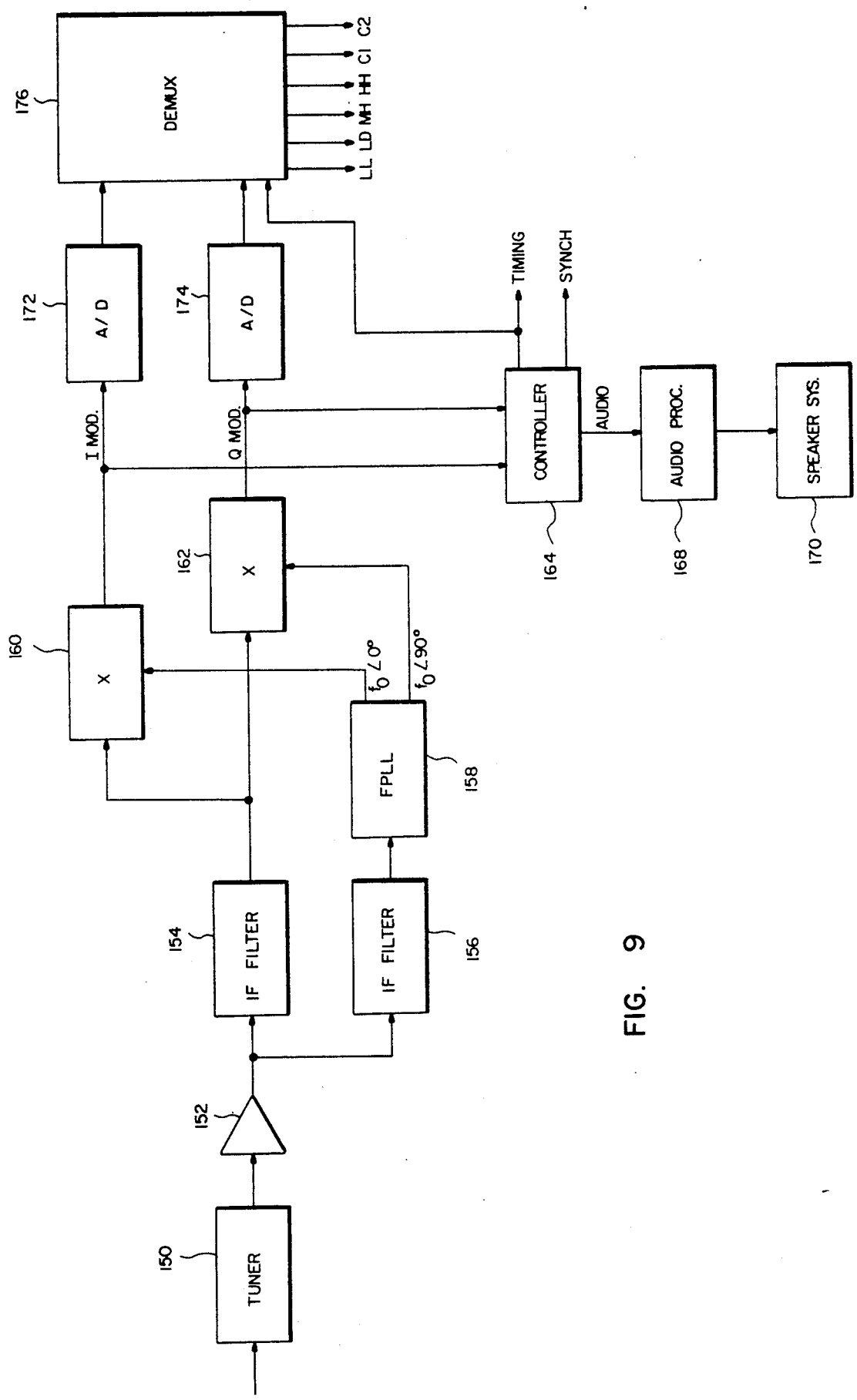
FIGS. 9 and 10 are block diagrams illustrating a receiver for receiving, decoding and displaying an HDTV video image according to the invention.
Figure 10:
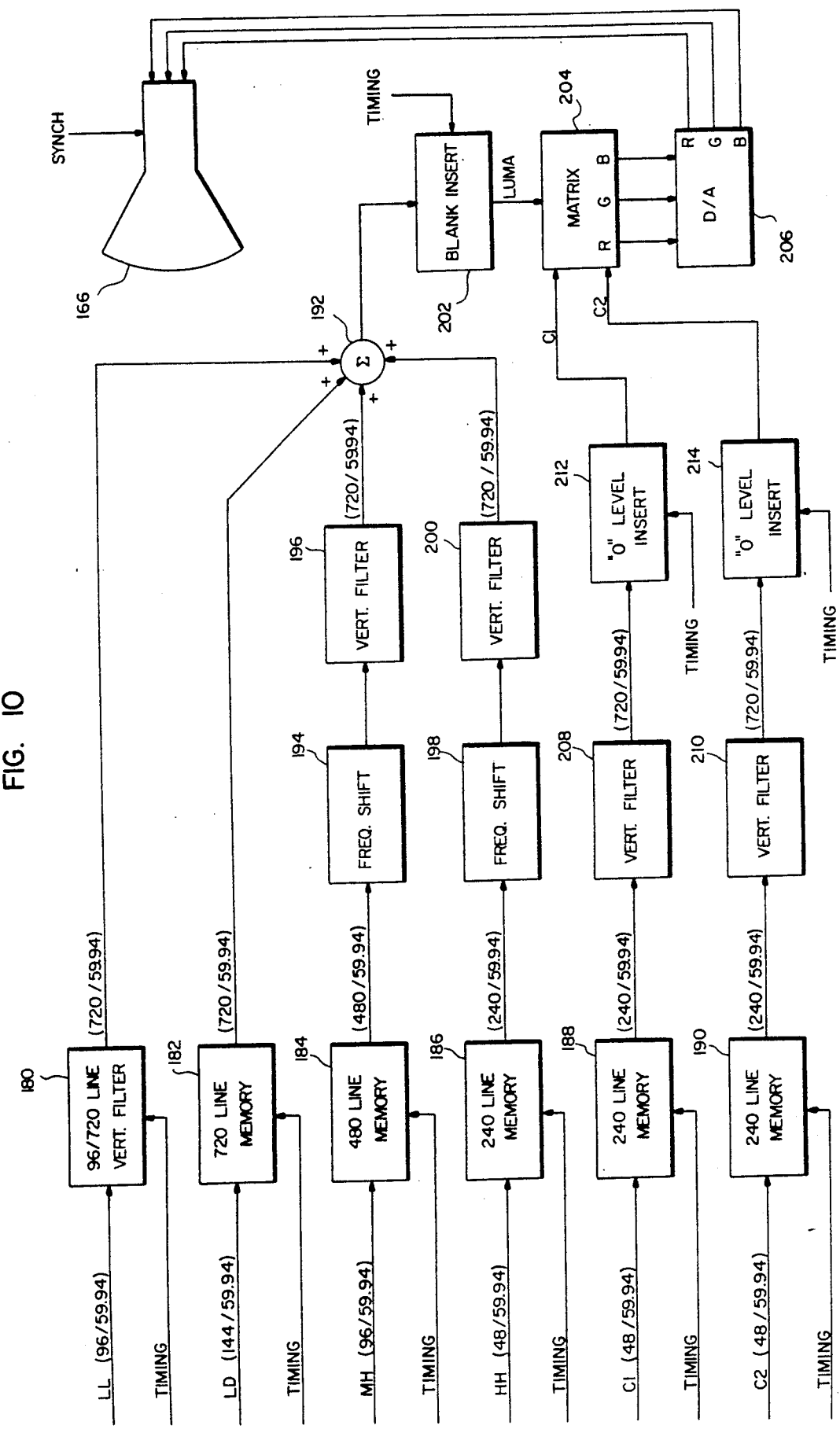

FIGS. 9 and 10 illustrate an HDTV receiver for receiving, decoding and displaying the HDTV signal transmitted as previously described. Referring initially to FIG. 9, the received HDTV signal is applied to a tuner 150 which selects and translates the received signal to a predetermined intermediate frequency (IF) signal. The IF output signal of tuner 150 is coupled by an amplifier 152 to the inputs of a pair of IF filters 154 and 156. The output of IF filter 156 is applied to a frequency and phase locked loop (FPLL) 158, which is preferably of the type disclosed in U.S. Pat. No. 4,072,909. FPLL 158 develops a pair of output carrier signals at the intermediate frequency, one output comprising an in-phase component and the other a quadrature component. The in-phase component is coupled to one input of a first multiplier 160 and the quadrature component is coupled to one input of a second multiplier 162. The output of IF filter 154 is applied to the other inputs of multipliers 160 and 162, which function to demodulate and thereby recover the I and Q channel modulation respectively of the received signal.

The I and Q channel modulation signals recovered at the outputs of multipliers 160 and 162 are applied to a controller circuit 164. Controller 164 recovers the digital information transmitted in the VBI of each sub-field for developing an output timing signal, an output synch signal and an output audio signal. It will be recalled that the VBI of each transmitted sub-field includes a high frequency data clock, a vertical chirp and a horizontal chirp. The data clock establishes the basic timing for operation of the receiver, with the two chirp signals identifying the clock phases required for deriving appropriate vertical and horizontal synch signals. The synch signals are thus derived by counting the data clock beginning with the clock phases identified by the respective chirp signals. As will be described in further detail, the derived horizontal and vertical synch signals are coupled to a CRT 166 (see FIG. 10) for controlling the deflection of one or more electron beams for facilitating reproduction of the received HDTV image. As previously described, the derived synch signals will establish a vertical deflection rate of 59.94 Hz (identical to NTSC) and a horizontal deflection rate of 47.2 KHz (three times NTSC). The audio output developed by controller 164 is applied to an audio processor 168 for processing the audio information for reproduction by a suitable speaker system 170.

The I and Q channel modulation signals recovered at the outputs of multipliers 160 and 162 respectively are also coupled to a pair of analog-to-digital converters 172 and 174 which convert the received analog lines of video information to corresponding digital signals. Each of the converters 172 and 174 therefore provides 240 lines of digital video information at a rate of 59.94 Hz. This digital video information is applied to a demultiplexer 176 which, in response to a timing signal from controller 164, separates the luma and color difference lines received each field and, provides the separated lines of video information at corresponding outputs LL, LD, MH, HH, C1 and C2. These outputs, together with the timing and synch signals provided by controller 164, are coupled to the video decoder of FIG. 10 for reproducing the transmitted HDTV video image.

Referring to FIG. 10, the 96 lines per field of video component LL developed at the output of demultiplexer 176 are coupled to a vertical filter 180 which is identical to vertical filter 32 in encoder 10. Filter 180, in response to a timing signal from controller 164, converts the 96 lines of component LL received each field to 720 lines using the same conversion algorithm used by filter 32. At the same time, the 720 lines are time compressed by a factor of 3.6:1. This allows for appropriate retrace blanking levels to be inserted in each of the lines consistent with the deflection signals applied to CRT 166. As previously mentioned, the conversion algorithm may employ a technique whereby weighted representations of the received lines are employed in deriving the interpolated lines. The output of vertical filter 180, which comprises 720 lines of component LL at a rate of 59.94 Hz, is applied to a first input of a summer 192.

The lines of video information comprising components LD, MH, HH, C1 and C2 developed at the output of demultiplexer 176 are coupled to respective memories 182, 184, 186, 188 and 190. Cumulatively, memories 182-190 provide sufficient memory for storing one complete frame of the received HDTV signal. In particular, memory 182 comprises a 720 line memory capable of storing the 720 interlaced lines of component LD received each 1/12 second. As previously described, 144 of these lines are received each field of the transmitted signal (1.59.94 seconds) in an interlaced pattern. The received video lines are stored in corresponding lines of the memory with 1/5 of the memory being updated every 1/59.94 seconds and the entire memory every 1/12 second. While the lines of component LD are written into memory 182 at the rate of 144 lines/59.94 seconds, they are read out of the memory in a non-destructive manner at the rate of 720 lines/59.94 seconds. On an individual basis, each line is read out of memory 182 3.6 times faster than it is read into the memory. As before, this compresses each line by an appropriate factor to allow for insertion of retrace blanking signals consistent with the horizontal and vertical deflection rates at which CRT 166 is operated. The 720 time compressed lines read out of memory 182 are coupled to a second input of summer 192.

Memory 184 comprises a 480 line memory capable of storing the 480 interlaced lines of component MH received each 1/12 second. As previously described, 96 of these lines are received each field of the transmitted signal in an interlaced pattern. The received video lines are stored in corresponding lines of the memory with 1/5 of the memory being updated every 1/59.94 seconds and the entire memory every 1/12 second. The stored video information is non-destructively read out of memory 184 at the rate of 480 lines/59.94 seconds, with each individual line being read out 3.6 times faster than it is read into the memory. As previously explained, each video line read out of the memory is therefore time compressed by a factor of 3.6:1 to allow for insertion of blanking levels consistent with the deflection rate at which CRT 166 is operated.

The time compressed lines of video information read out of memory 184 are coupled to a frequency shifting network 194 and therefrom to a vertical filter 196. Frequency shifting network 194 translates the video information to the frequency band 9.6-19.3 MHz corresponding to the middle one-third of the luma horizontal frequencies. The frequency shifted lines of component MH are then filtered in vertical filter 196 to provide 720 lines/59.94 seconds, which are coupled to a third input of summer 192.

The video lines comprising component HH are processed in a similar manner. Thus, the 48 lines received each field are stored in 240 line memory 186 with 1/5 of the memory being updated every 1/59.94 seconds and the entire memory every 1/12 second. The stored video information is non-destructively read out of the memory at a rate of 240 lines/59.94 seconds, each individual line being read out 3.6 times faster than it is read into the memory provide a corresponding time compression. The output of the memory is coupled to a second frequency shifting network 198 which translates the video information to the frequency band 19.3-28.9 MHz corresponding to the high one-third of the luma horizontal frequencies. The frequency shifted lines of component HH are then filtered in a vertical filter 200 to provide 720 lines/59.94 seconds, which are coupled to a fourth input of summer 192.

Summer 192 thus serves to reconstruct the HDTV luma signal by summing corresponding ones of the 720 lines of each of the LL, LD, MH and HH components applied thereto every 1/59.94 seconds. The reconstructed luma signal therefore represents all of the horizontal frequencies of the HDTV luma source signal provided at input terminal 12 of encoder 10 with reduced diagonal resolution. The signal includes 720 lines of active video presented for display at a frame refresh rate of 59.94 Hz. In order to provide appropriate retrace blanking intervals, the reconstructed luma signal is applied to a blanking signal insert circuit 202, which also receives a timing input from controller 164. Blanking insert circuit 202 inserts appropriate horizontal and vertical retrace blanking levels into the reconstructed luma signal. Thus, a blanking level occupying about 1/6 of each line is provided for horizontal retrace, vertical retrace being accommodated by providing a blanking level for the 67.5 VBI lines. The output of blanking circuit 202 is then applied to a matrix 204, which also receives the reconstructed color difference signals C1 and C2 to provide output R, G and B signals. The R, G and B signals are converted to an analog form by a D/A converter 206 and then coupled to CRT 166 for display. As previously mentioned, the display will comprise 720 lines of active video reproduced at a horizontal deflection rate of 47.2 KHz (three times NTSC) and at a frame rate of 59.94 Hz (equal to the NTSC field rate). The frequencies represented by the LL component of the luma signal are updated each display frame while 1/5 of the remaining luma frequencies are updated at the display frame rate and fully over five successive display frames.

The lines of color difference components C1 and C2 are reconstructed in a manner similar to that described in connection with the luma components. Thus, the 48 lines of each of components C1 and C2 received each field in an interlaced pattern are stored in respective memories 188 and 190, with 1/5 of each memory being updated every 1/59.94 seconds and the entire memories every 1/12 second. The stored color information is non-destructively read out of the memories at a rate of 240 lines/59.94 seconds, each individual line again being read out of memory 3.6 times faster than it is read in to provide a corresponding time compression. The outputs of memories 188 and 190 are then filtered by respective vertical filters 208 and 210, each providing 720 lines of color difference signals every 1/59.94 second. The vertically filtered color difference lines are finally coupled to matrix 204 through respective "0" level insert circuits 212 and 214. Circuits 212 and 214 insert "0" level signals into the color difference lines corresponding to the blanking levels inserted in the reconstructed luma signal.

What has been described is a novel HDTV method and apparatus. It is recognized that numerous changes and modifications of the described embodiments will be apparent to those skilled in the art without departing from the true spirit and scope of the invention. For example, the horizontal frequency bands provided by encoder may vary somewhat from those shown, a range of from about 9.2 MHz to about 10.0 MHz being preferred. Also, the number of lines comprising components LL, LD, MH, HH, C1 and C2, and their manner of transmission may vary from that shown. Thus, component LL may, for example, comprise more than 96 lines which are transmitted in two successive fields. It will be recognized that in this modification the lines of component LL are still transmitted at a higher temporal rate than the lines of the other components. The invention is therefore to be limited only as defined in the claims.

What is claimed is:

1. A method of transmitting and receiving a non-compatible high definition television signal comprising:
   providing a television signal comprising 787.5 progressively scanned first horizontal lines of video information during each of a plurality of successive frames, said first lines occurring at a vertical rate equal to the NTSC field repetition rate and at a horizontal rate equal to three times the NTSC horizontal scanning rate;
   deriving a plurality of second horizontal lines of video information from said plurality of first lines and transmitting said second lines at a vertical rate equal to the NTSC field repetition rate and at a horizontal rate equal to the NTSC horizontal scanning rate; and
   receiving and converting said plurality of second lines to a plurality of third horizontal lines of video information for providing a high definition display at preselected vertical and horizontal repetition rates.

2. The method of claim 1 wherein said transmitting step comprises transmitting a portion of said second lines at a first frame refresh rate less tan the NTSC frame refresh rate and transmitting the remaining ones of said second lines at a second frame refresh rate greater than the NTSC frame refresh rate.

3. The method of claim 2 wherein the video information represented by said portion of said second lines is characterized by levels of horizontal and vertical resolution below respective first and second values and wherein the video information represented by said remaining second lines is characterized by levels of horizontal and vertical resolution greater than said first and second values respectively.

4. The method of claim 3 wherein said preselected horizontal rate is three times the NTSC horizontal scanning rate, wherein said preselected vertical rate is equal to the NTSC field repetition rate and wherein said first and second frame refresh rates are ½ and 5/2 times the NTSC frame refresh rate respectively.

5. The method of claim 4 wherein said first and second values are about 9.2–10.0 MHz and 96 pels/h respectively.

6. The method of claim 1 wherein each of said frames of 787.5 progressively scanned first horizontal lines of video information comprises 720 active lines and 67.5 vertical retract lines.

7. The method of claim 6 including transmitting said second horizontal lines of video information on respective quadrature components of a selected video carrier.

8. A high definition television system comprising:
means for providing a television signal comprising 787.5 progressively scanned first horizontal lines of video information during each of a plurality of successive frames, said first lines occurring at a vertical rate equal to the NTSC field repetition rate and at a horizontal rate equal to three times the NTSC horizontal scanning rate;
means for deriving a plurality of second horizontal lines of video information from said plurality of first lines and means for transmitting said second lines at a vertical rate equal to the NTSC field repetition rate and at a horizontal rate equal to the NTSC horizontal scanning rate; and
means for receiving and converting said plurality of second lines to a plurality of third horizontal lines of video information for providing a high definition display at preselected vertical and horizontal repetition rates.

9. The system of claim 8 wherein each of said frames of 787.5 progressively scanned first horizontal lines of video information comprises 720 active lines and 67.5 vertical retrace lines.

10. The system of claim 9 wherein said transmitting means comprises means for transmitting said second horizontal lines of video information on respective quadrature components of a selected video carrier.

11. In a non-compatible high definition television system including a high definition video source signal defined by a plurality of first horizontal lines of video information occurring at a vertical rate equal to the NTSC field repetition rate and at a predetermined horizontal rate greater than the NTSC horizontal scanning rate and means for transmitting a plurality of second horizontal lines of video information representing said video source signal at a vertical rate equal to the NTSC field repetition rate and at a horizontal rate equal to the NTSC horizontal scanning rate, a receiver comprising:
means for receiving said transmitted second lines of video information; and
means for converting said received second lines into a plurality of third lines of video information for providing a 787.5 line progressively scanned display at a vertical rate equal to the NTSC field repetition rate and at a horizontal rate equal to three times the NTSC horizontal scanning rate.

12. The receiver of claim 11 wherein each frame of said 787.5 line progressively scanned display comprises 720 active lines and 67.5 vertical retrace lines.

13. A method of transmitting and receiving a non-compatible high definition television signal comprising:
providing a high definition television signal comprising a plurality of first horizontal lines of video information having selected horizontal and vertical repetition rates;
deriving a plurality of second horizontal lines of video information from said plurality of first lines and transmitting said second lines at a vertical rate equal to the NTSC field repetition rate and at a horizontal rate equal to the NTSC horizontal scanning rate; and
receiving and converting said plurality of second lines to a plurality of third horizontal lines of video information for providing a 787.5 line progressively scanned display at a vertical rate equal to the NTSC field repetition rate and at a horizontal rate equal to three times the NTSC horizontal scanning rate.

14. The method of claim 13 wherein each frame of said 787.5 line progressively scanned display comprises 720 active lines and 67.5 vertical retrace lines.

15. The method of claim 14 including transmitting said second horizontal lines of video information on respective quadrature components of a selected video carrier.

16. A non-compatible high definition television system comprising:
means for providing a high definition television signal comprising a plurality of first horizontal lines of video information having selected horizontal and vertical repetition rates;
means for deriving a plurality of second horizontal lines of video information from said plurality of first lines and means for transmitting said second lines at a vertical rate equal to the NTSC field repetition rate and at a horizontal rate equal to the NTSC horizontal scanning rate; and
means for receiving and converting said plurality of second lines to a plurality of third horizontal lines of video information for providing a 787.5 line progressively scanned display at a vertical rate equal to the NTSC field repetition rate and at a horizontal rate equal to three times the NTSC horizontal scanning rate.

17. The system of claim 16 wherein each frame of said 787.5 line progressively scanned display comprises 720 active lines and 67.5 vertical retrace lines.

18. The system of claim 17 wherein said transmitting means comprises means for transmitting said second horizontal lines of video information on respective quadrature components of a selected video carrier.

19. A method of transmitting and receiving a non-compatible television signal comprising:
providing a television signal comprising 787.5 progressively scanned first horizontal lines of video information during each of a plurality of successive frames, said first lines occurring at a vertical rate equal to the NTSC field repetition rate and at a horizontal rate equal to three times the NTSC horizontal scanning rate;
deriving a plurality of signal components from said plurality of first lines and transmitting said signal components at a vertical rate equal to the NTSC field repetition rate and at a horizontal rate equal to the NTSC horizontal scanning rate; and
receiving and converting said plurality of signal components to a plurality of second horizontal lines of video information for providing a 787.5 line progressively scanned display at a vertical rate equal to the NTSC field repetition rate and at a horizontal rate equal to three times the NTSC horizontal scanning rate.

20. The method of claim 19 including transmitting said signal components on respective quadrature components of a selected video carrier.

21. The method of claim 19 wherein each frame of said 787.5 line progressively scanned display comprises 720 active lines and 67.5 vertical retrace lines.

22. The method of claim 19 wherein each of said frames of 787.5 progressively scanned first horizontal lines of video information comprises 720 active lines and 67.5 vertical retrace lines.

23. The method of claim 19 wherein said signal components are transmitted at temporal rates having at least two different values.

24. A non-compatible high definition television system comprising:
means for providing a television signal comprising 787.5 progressively scanned first horizontal lines of video information during each of a plurality of successive frames, said first lines occurring at a vertical rate equal to the NTSC field repetition rate and at a horizontal rate equal to three times the NTSC horizontal scanning rate;
means for deriving a plurality of signal components from said plurality of first lines and means for transmitting said signal components at a vertical rate equal to the NTSC signal repetition rate and at a horizontal rate equal to the NTSC horizontal scanning rate; and
means for receiving and converting said plurality of signal components to a plurality of second horizontal lines of video information for providing a 787.5 line progressively scanned display at a vertical rate equal to the NTSC field repetition rate and at a horizontal rate equal to three times the NTSC horizontal scanning rate.

25. The system of claim 24 wherein said signal components are transmitted at temporal rates having at least two different values.

26. The system of claim 24 wherein said transmitting means comprises means for transmitting said signal components on respective quadrature components of a selected video carrier.

27. The system of claim 24 wherein each frame of said 787.5 line progressively scanned display comprises 720 active lines and 67.5 vertical retrace lines.

28. The system of claim 24 wherein each of said frames of 787.5 progressively scanned first horizontal lines of video information comprises 720 active lines and 67.5 vertical retrace lines.

29. In a non-compatible high definition television system including a high definition video source signal defined by a plurality of first horizontal lines of video information occurring at a vertical rate equal to the NTSC field repetition rate and at a predetermined horizontal rate greater than the NTSC horizontal scanning rate and means for transmitting a plurality of signal components representing said video source signal at a vertical rate equal to the NTSC field repetition rate and at a horizontal rate equal to the NTSC horizontal scanning rate, a receiver comprising:
means for receiving said transmitted signal components; and
means for converting said received signal components into a plurality of second lines of video information for providing a 787.5 line progressively scanned display at a vertical rate equal to the NTSC field repetition rate and at a horizontal rate equal to three times the NTSC horizontal scanning rate.

30. In a non-compatible high definition television system including means for transmitting a high definition television signal at selected horizontal and vertical repetition rates, a receiver comprising:
means for receiving said transmitted high definition television signal; and
means for processing said received high definition television signal for providing a 787.5 line progressively scanned display at a vertical rate equal to the NTSC field repetition rate and at a horizontal rate equal to three times the NTSC horizontal scanning rate.

31. The receiver of claim 30 wherein each frame of said 787.5 line progressively scanned display comprises 720 active lines and 67.5 vertical retrace lines.

* * * * *